United States Patent Office 3,463,832
Patented Aug. 26, 1969

3,463,832
STABILIZED CHLORINATED POLYVINYL CHLORIDE COMPOSITIONS CONTAINING A POLYEPOXIDE AND AN ALKYL PHENOL
Friedrich Wollrab, Forest, Brussels, and Pierre Decroly, Uccle, Brussels, Belgium, assignors to Solvay & Cie, Brussels, Belgium, a corporation of Belgium
No Drawing. Filed Mar. 14, 1967, Ser. No. 622,895
Claims priority, application Belgium, Mar. 16, 1966, 25,307, Patent 677,885
Int. Cl. C08f 45/58, 29/20
U.S. Cl. 260—837                    13 Claims

ABSTRACT OF THE DISCLOSURE

Stabilized chlorinated polyvinyl chloride compositions containing per 100 parts of chlorinated polyvinyl chloride from 0.5 to 5 parts of an epoxidized derivative selected from the group consisting of polyglycidyl ethers and cycloaliphatic epoxides, from 0.1 to 2 parts of an alkylphenol, and, optionally, from 0.1 to 2 parts of pentaerythritol.

BACKGROUND OF THE INVENTION

The present invention relates to stabilized compositions based on chlorinated polyvinyl chloride. It is known that chlorinated polymers or resins tend to decompose when subjected to high temperatures, which results particularly in a considerable alteration of their color in the preparation and utilization of the compositions.

This sensitivity to heat of chlorinated polymers has often restricted their application in fields where their utilization is desirable and even necessary. In order to overcome these disadvantages, a large number of stabilizers and stabilizing combinations have already been proposed.

Nevertheless, the problem of stabilization of chlorinated resins is very complex, because the action of the stabilizers is a specific action varying with the type of resin employed, the type of plasticizer, and also the conditions of utilization and application. Moreover, a very pronounced synergistic phenomenon is often observed in the action of thermal stabilizers, this phenomenon varying with the type of resin used.

In the majority of cases the conventional stabilizers for polyvinyl chloride are less effective or are unsuitable for other chlorinated resins, particularly for chlorinated polyolefins or chlorinated polyvinyl chloride. It is in fact found that the most effective stabilizers for polyvinyl chloride, particularly stabilizing compositions based on tin and lead derivatives and also barium-cadmium and calcium-zinc soaps, give mediocre results when they are used for stabilizing chlorinated polyvinyl chloride. This fact is illustrated by the results given in Table I below. Moreover, the best stabilizers for polyvinyl chloride are relatively expensive and most of them are toxic.

TABLE I

| | | | | |
|---|---|---|---|---|
| Chlorinated polyvinyl chloride containing 685 g. of Cl per kg. of polyvinyl chloride, g | | 100 | | |
| Polyvinyl chloride, g | 100 | | | |
| Lead based liquid organic stabilizer, g | | 1.2 | | 1.2 |
| Epoxidized soya oil, g | 3 | 4 | 3 | 4 |
| Wax, g | | 1 | | 1 |
| Barium-cadmium soap, g | 3 | | 3 | |
| Phosphite, g | 1 | | 1 | |
| Calcium-zinc soap, g | | 1.5 | | 1.5 |
| α-Phenylindole, g | | 0.5 | | 0.5 |
| Arschid oil, g | | 1 | | 1 |
| Organic tin compound, g | | 2 | | 2 |
| Tribasic lead sulphate, g | | 2.6 | | 2.6 |
| Calcium stearate, g | | 0.3 | | 0.3 |
| Thermal stability at 180° C. before turning brown, min | 110–115 | 120–125 >140 | >140 | |
| Before complete decomposition at 180° C., min | 120–125 | 130 >140 | >140 | |
| Thermal stability at 200° C., before turning brown, min | | | 40–45 40–50 | 55–60 55–60 |
| Before complete decomposition at 180° C., min | | | 50 60 | 65–70 70 |

SUMMARY OF THE INVENTION

According to the present invention, there are provided multi-constituent stabilization formulas which are found to be specific and very effective for the stabilization of chlorinated polyvinyl chloride.

This is all the more unexpected inasmuch as the compositions according to the invention contain only stabilizers which in the case of polyvinyl chloride are considered as auxiliary stabilizers and give only mediocre or inadequate results.

The stabilized chlorinated polyvinyl chloride compositions according to the invention contain per 100 parts of chlorinated polyvinyl chloride, as the stabilizer, from 0.5 to 5 parts of an epoxidized derivative selected from the group consisting of polyglycidyl ethers and cycloaliphatic epoxides and from 0.1 to 2 parts of an alkylphenol. In these formulas, the respective effects of the constituents are accompanied by a remarkable synergistic effect.

The invention also relates to stabilized chlorinated polyvinyl chloride compositions in which the stabilizing system comprises, in addition to the above-mentioned ingredients, from 0.1 to 2 parts of pentaerythritol per 100 parts of chlorinated polyvinyl chloride.

The expression "chlorinated polyvinyl chloride" is understood to encompass very generally all products of chlorination of polyvinyl chloride. All expressions of compositions in "parts" are understood to be by weight.

DESCRIPTION OF THE PREFERRED EMBODIMENTS

The stabilization formulas of the present invention are especially suitable for chlorinated polyvinyl chloride the chlorine content of which is between 600 and 750 g. of chlorine per kg. and even more especially suitable for chlorinated polyvinyl chloride the chlorine content of which is between 600 and 750 g. of chlorine per kg. and even more especially suitable for chlorinated polyvinyl chloride containing from 650 to 700 g. of chlorine per kg. The stabilization formulas are also applicable to compositions composed of chlorinated polyvinyl chloride and other chlorinated or non-chlorinated resins such as ethylene-vinyl acetate copolymers, polyvinyl chloride, and chlorinated polyethylene. In particular, ethylene-vinyl acetate copolymers may be added to the chlorinated polyvinyl chloride in proportions of about from 1 to 10 parts per 100 parts of chlorinated polyvinyl chloride.

The epoxidized derviatives utilized in accordance with the invention are selected from the group consisting of polyglycidyl ethers and cycloaliphatic epoxides. The most suitable polyglycidyl ethers are in particular the epoxy resins obtained by polycondensation of bisphenol-A and epichlorhydrin.

Examples of suitable cycloaliphatic epoxides are 3,4-epoxy-6-methylcyclohexylmethyl-3,4-epoxy - 6 - methyl-cyclohexane carboxylate and 1-epoxyethyl-3,4-epoxycyclohexane.

Particularly advantageous products for the practical performance of the invention are the products sold in commerce under the name Epikote 834 and 828, and DER 332 in the case of polyglycidyl ethers and UNOX 221 and 206 in the case of cycloaliphatic epoxides.

The alkylphenol compounds preferably used are ditertbutylparacresol and 1,1,3-tris(2-methyl-4-hydroxy-5-tert-butylphenyl)-butane.

The stabilizing systems may also contain pentaerythritol.

The polyglycidyl ether or cycloaliphatic epoxide, alkylphenol and pentaerythritol constituents are specific to the stabilizing compositions of the invention and cannot be replaced by similar compounds. For example, if pentaerythritol is replaced in the stabilization formulas by other polyhydroxylated alcohols such as sorbitol and glycerol, compositions are obtained which have only a mediocre stabilizing effect on chlorinated polyvinyl chloride.

The stabilized compositions of the invention are especially suitable for the production of articles such as drinking water supply piping, films for wrapping foodstuffs, and the like.

A surprising effect of the stabilizing systems of the present invention resides in the fact that they give rise to effective stabilization of chlorinated polyvinyl chloride, whereas each of the main constituents used separately gives very mediocre results.

The examples given below demonstrate the synergistic effect of the different constituents of the binary and ternary stabilizing systems of the invention.

In the following examples the method used to measure the thermal stability of the compositions is as follows:

A thin sheet constituted of a homogeneous composition of the resin and the stabilizing agents is made with the aid of a roller mixer. The sheet is cut into rectangular test pieces which are then placed in a ventilated oven at 200° C. The test pieces are withdrawn at intervals of 10 minutes, and the evolution of their coloration, until browning and subsequent blackening, is observed.

Thermal stability of a test piece is expressed by the periods during which the test piece can remain at 200° C. before, on the one hand, it turns brown and, on the other hand, before it completely decomposes as evidenced by its turning black.

In the comparative examples relating to polyvinyl chloride paste compositions, thermal stability is measured at 180° C., because the polyvinyl chloride would so rapidly decompose at a higher temperature as to make the meaningful measurement of decomposition times impractical.

Examples 1 to 8

Compositions containing the ingredients listed in Table II are prepared by malaxation, and the thermal stability of the test pieces obtained is measured by the method described above. Comparative examples are differentiated from examples according to the invention by the use of R followed by a subscript numeral to designate the former.

TABLE II

| Examples | $R_1$ | $R_2$ | $R_3$ | $R_4$ | $R_5$ | $R_6$ | 7 | 8 |
|---|---|---|---|---|---|---|---|---|
| Chlorinated polyvinyl chloride containing 685 g. of Cl per kg., g | 100 | 100 | 100 | 100 | | | 100 | 100 |
| Polyvinyl chloride, g | | | | | 100 | 100 | | |
| Lubricant | 1 | 1 | 1 | | 1 | 1 | 1 | 1 |
| Polyglycidyl ether (Epikote 834), g | | 2 | | | 2 | 2 | 2 | 2 |
| Di-tert-butylparacresol, g | | | 0.5 | | 0.5 | 0.5 | 0.5 | 0.5 |
| Pentaerythritol, g | | | | 0.6 | | 0.6 | | 0.6 |
| Thermal stability at 200° C.: | | | | | | | | |
| Before turning brown, min | 10 | 60–70 | 30 | 40 | | | 90–100 | 95–100 |
| Before complete decomposition, min | 15–20 | 80 | 35–40 | 45–50 | | | 110 | 110–115 |
| Thermal stability at 180° C.: | | | | | | | | |
| Before turning brown, min | | | | | <50 | 60–80 | | |
| Before complete decomposition, min | | | | | <50 | 85–80 | | |

The results of Examples $R_2$ to $R_4$ clearly show the poor stabilizing effect of the different ingredients when used separately.

Example 7 clearly indicates the synergistic effect of the constituents of a polyglycidyl ether-alkylphenol stabilizing system according to the invention, while the comparative Example $R_5$ shows the poor thermal stability associated with the use of this same stabilizing system in the case of polyvinyl chloride.

Example 8 indicates the excellent stabilizing effect of the ternary stabilizing system polyglycidyl ether-alkylphenol-pentaerythritol according to the invention. Example $R_6$ shows that this system applied to polyvinyl chloride effects only mediocre stabilization.

Examples 9 to 12

Chlorinated polyvinyl chloride compositions containing the stabilizing systems listed in Table III are prepared.

The thermal stability at 200° C. of the test pieces is measured and the results of these tests show the remarkable stabilizing effect of the various systems referred to.

TABLE III

| Examples | 9 | 10 | 11 | 12 |
|---|---|---|---|---|
| Chlorinated polyvinyl chloride containing 635 g. of Cl per kg., g | 100 | 100 | 100 | 100 |
| Lubricant, g | 1 | 1 | 1 | 1 |
| Polyglycidyl ether (DER 332), g | 2 | | | |
| 3,4-epoxy-6-methylcyclohexylmethyl-3,4-epoxy-6-methylcyclohexane carboxylate, g | | 2 | | |
| 1-epoxyethyl-3,5-epoxycyclohexane | | | 2 | 2 |
| Di-tert-butylparacresol | 0.5 | 0.5 | 0.5 | 0.5 |
| Pentaerythritol | | | | 0.6 |
| Thermal stability at 200° C.: | | | | |
| Before turning brown, min | 80 | 90 | 80 | 80–85 |
| Before complete decomposition, min | 120–130 | 130–140 | 100–110 | 90–95 |

Examples 13 and 14

Mixtures of chlorinated polyvinyl chloride and ethylene-vinyl acetate copolymers containing stabilizing systems according to the invention are prepared. The thermal stability at 200° C. of the test pieces is measured. The results of these tests, which are shown in Table IV below, illustrate the excellent stabilizing effect of the stabilizing systems forming the object of the invention.

TABLE IV

| Examples | 13 | 14 |
|---|---|---|
| Chlorinated polyvinyl chloride having 685 g. Cl/kg | 100 | 100 |
| Ethylene-vinyl acetate copolymer (Elvax 420) | 3 | |
| Ethylene-vinyl acetate copolymer (Elvax 460) | | 3 |
| Polyglycidyl ether (Epikote 834) | 2 | 2 |
| Di-tertbutylparacresol | 0.5 | 0.5 |
| Pentaerythritol | 0.6 | 0.6 |
| Lubricant | 1 | 1 |
| Thermal stability at 200° C.: | | |
| Before turning brown, min | 95–100 | 100–105 |
| Before complete decomposition, min | 105–110 | 100 |

While the invention has been described by reference to particular embodiments, it is intended that these embodiments be illustrative and not restrictive.

What we claim and desire to secure by Letters Patent is:

1. A composition consisting essentially of chlorinated polyvinyl chloride admixed with, as a stabilizer for the chlorinated polyvinyl chloride, per 100 parts by weight of the chlorinated polyvinyl chloride, from 0.5 to 5 parts by weight of an epoxidized derivative selected from the group consisting of polyglycidyl ethers and cycloaliphatic epoxides, and from 0.1 to 2 parts by weight of an alkylphenol.

2. A composition according to claim 1, further comprising, as another constituent of the stabilizer, from 0.1 to 2 parts by weight pentaerythritol per 100 parts by weight of the chlorinated polyvinyl chloride.

3. A composition according to claim 1, in which the epoxidized derivative is a polyglycidyl ether of Bisphenol A.

4. A composition according to claim 1, in which the epoxidized derivative is 3,4-epoxy-6-methylcyclohexyl-methyl-3,4-epoxy-6-methylcyclohexane carboxylate.

5. A composition according to claim 1, in which the epoxidized derivative is 1-epoxyethyl-3,4-epoxycyclohexane.

6. A composition according to claim 1, in which the alkylphenol is di-tert-butylparacresol.

7. A composition according to claim 1, in which the alkylphenol is 1,1,3-tris(2-methyl-4-hydroxy-5-tert-butylphenyl)butane.

8. A composition according to claim 1, further comprising admixed with the chlorinated polyvinyl chloride, about from 1 to 10 parts by weight of an ethylene-vinyl acetate copolymer per 100 parts by weight of the chlorinated polyvinyl chloride.

9. A composition according to claim 2, further comprising, admixed with the chlorinated polyvinyl chloride, about from 1 to 10 parts by weight of an ethylene-vinyl acetate copolymer per 100 parts by weight of the chlorinated polyvinyl chloride.

10. A shaped article constituted of a composition consisting essentially of chlorinated polyvinyl chloride admixed with, as a stabilizer for the chlorinated polyvinyl chloride, per 100 parts by weight of the chlorinated polyvinyl chloride, from 0.5 to 5 parts by weight of an epoxidized derivative selected from the group consisting of polyglycidyl ethers and cycloaliphatic epoxides, and from 0.1 to 2 parts by weight of an alkylphenol.

11. A shaped article according to claim 10, in which the composition further comprises, as another constituent of the stabilizer, from 0.1 to 2 parts by weight of pentaerythritol per 100 parts by weight of the chlorinated polyvinyl chloride.

12. A shaped article according to claim 10, further comprising admixed with the chlorinated polyvinyl chloride about from 1 to 10 parts by weight of an ethylene-vinyl acetate copolymer per 100 parts by weight of the chlorinated polyvinyl chloride.

13. A shaped article according to claim 11, further comprising admixed with the chlorinated polyvinyl chloride about from 1 to 10 parts by weight of an ethylene-vinyl acetate copolymer per 100 parts by weight of the chlorinated polyvinyl chloride.

References Cited

UNITED STATES PATENTS 3,057,746  10/1962  Edmonds _____ 117—161

FOREIGN PATENTS 1,330,084  5/1963  France.
124,048  2/1959  USSR.
137,975  5/1960  USSR.

MURRAY TILLMAN, Primary Examiner

P. LIEBERMAN, Assistant Examiner

U.S. Cl. X.R.

260–23, 45.75, 45.95, 836